INVENTOR.
Albert F. Hickman
BY
Pope and Sommer
Attorneys.

Jan. 16, 1962 A. F. HICKMAN 3,017,195
TANDEM AXLE SPRING SUSPENSION
Filed Feb. 18, 1959 9 Sheets-Sheet 2

INVENTOR.
Albert F. Hickman
BY
Popp and Sommer
Attorneys.

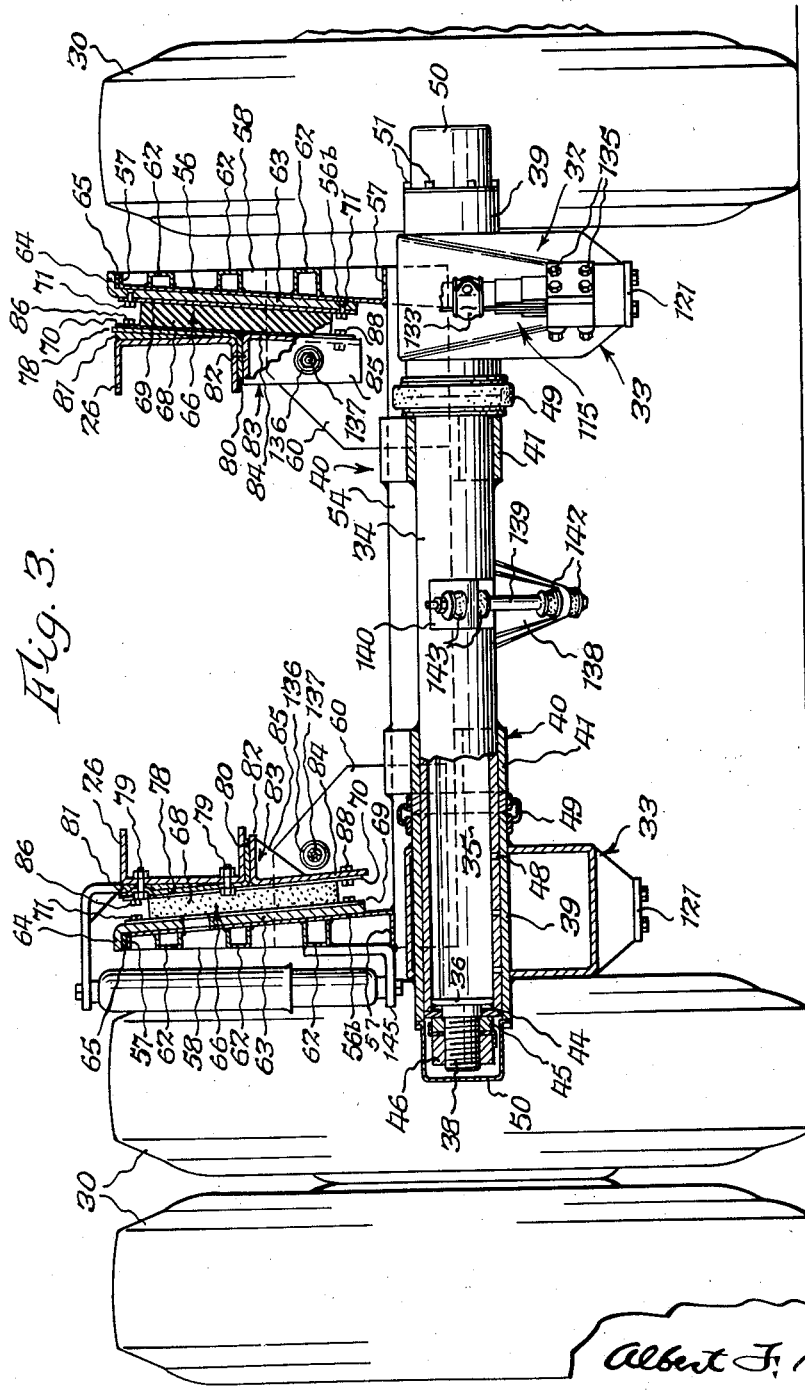

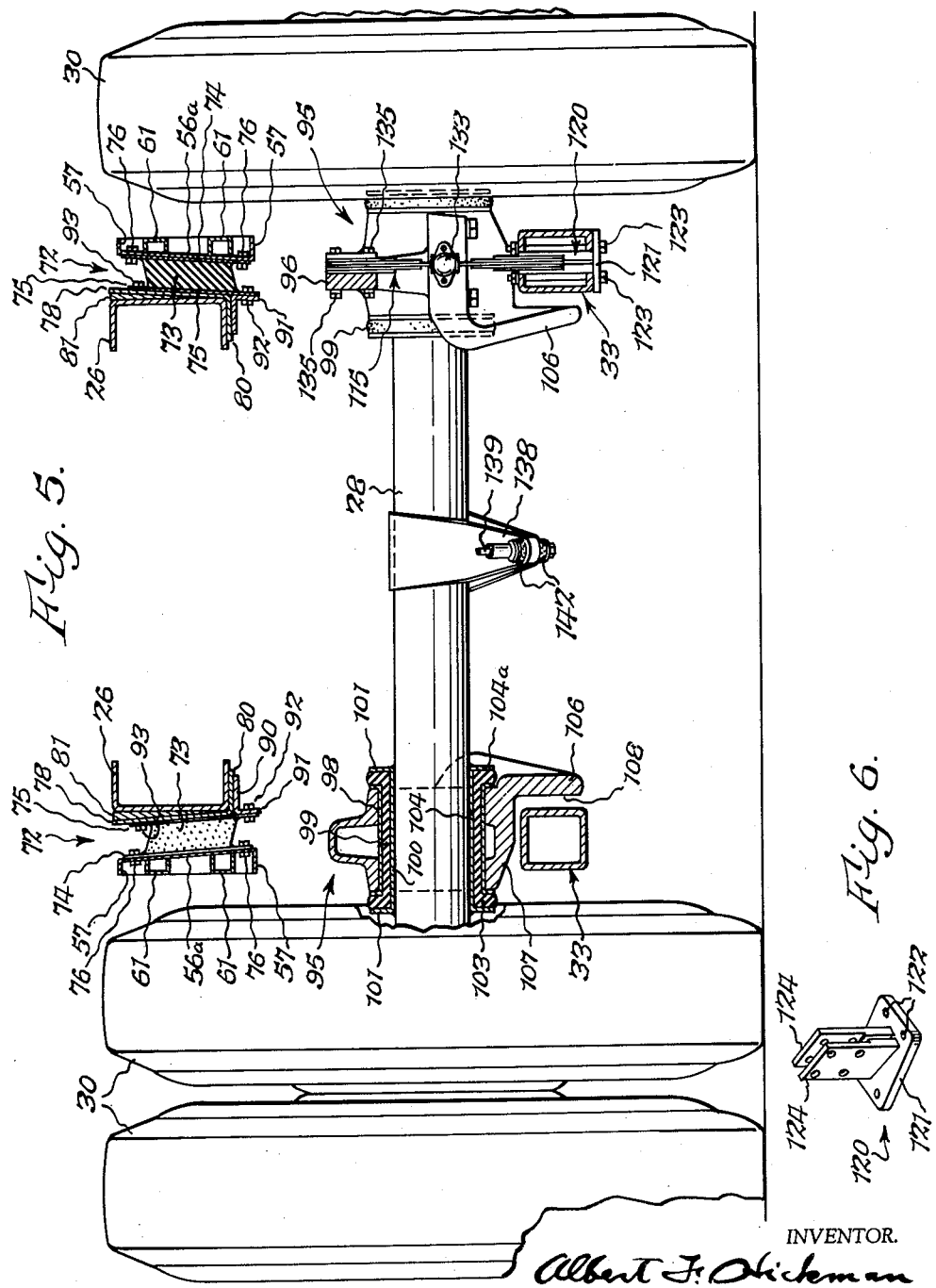

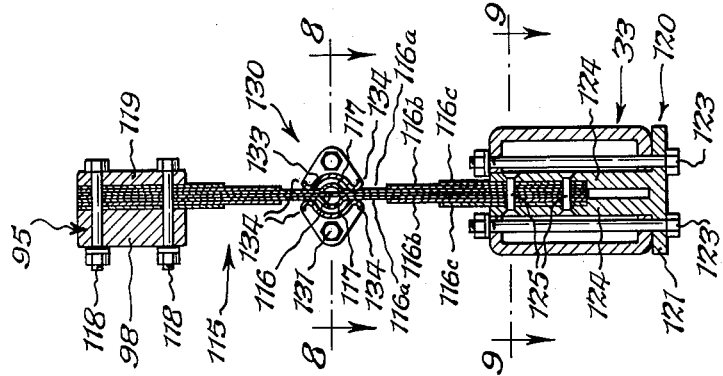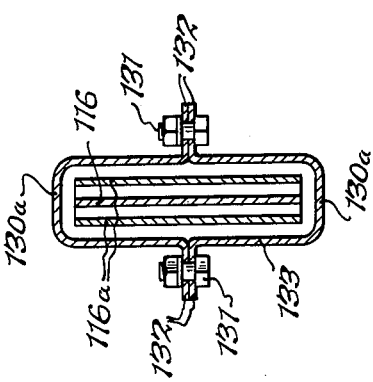

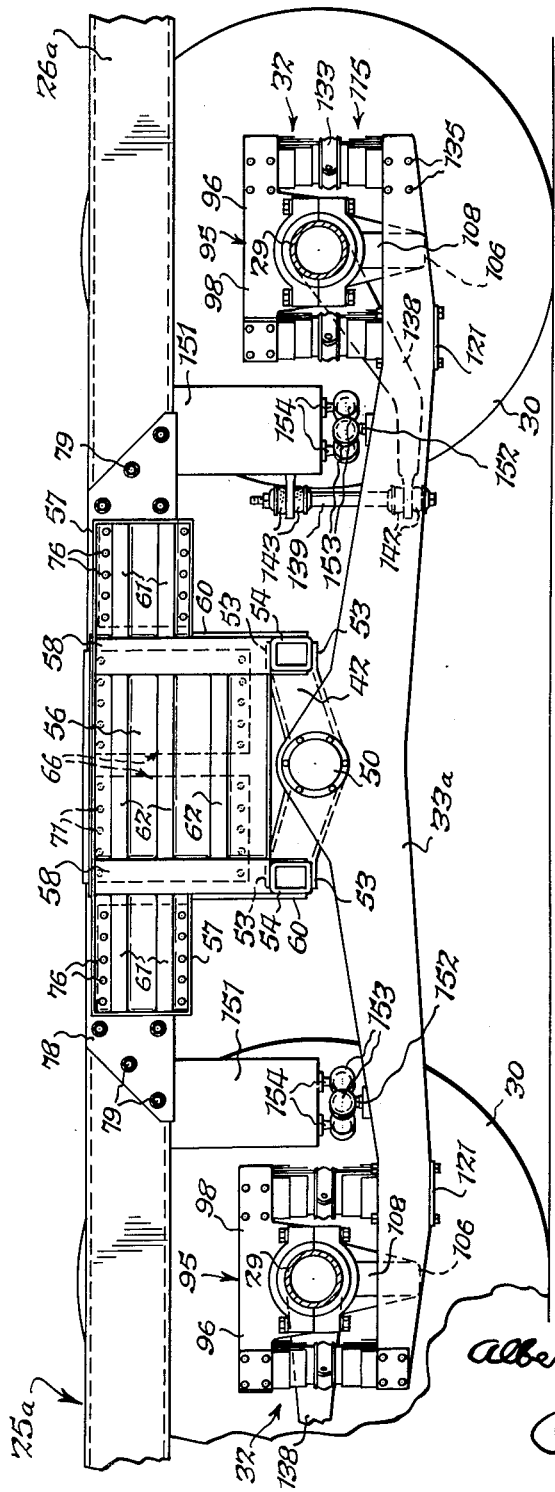

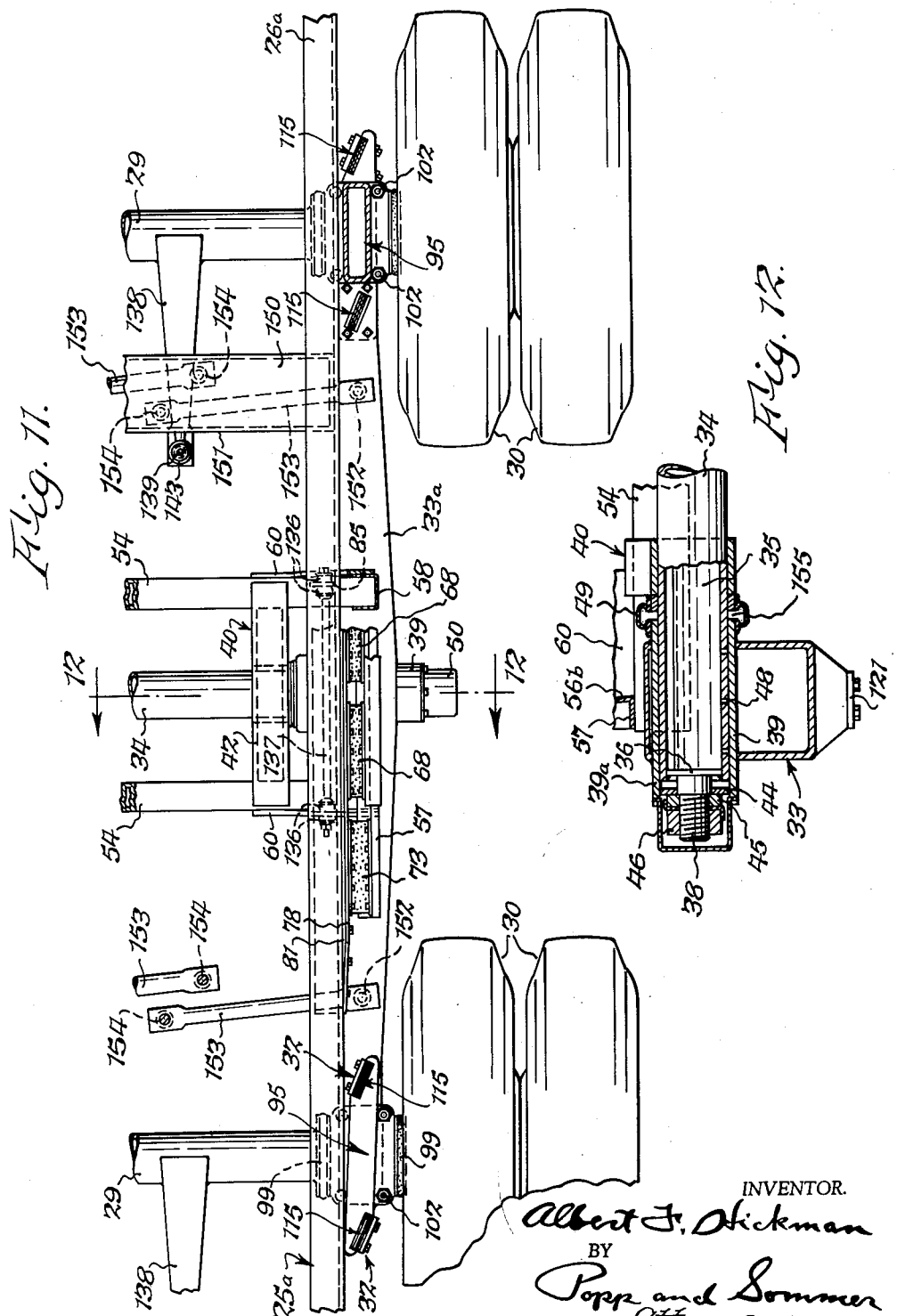

Jan. 16, 1962 　　　A. F. HICKMAN　　　3,017,195
TANDEM AXLE SPRING SUSPENSION
Filed Feb. 18, 1959　　　　　　　　　　　　　9 Sheets-Sheet 8
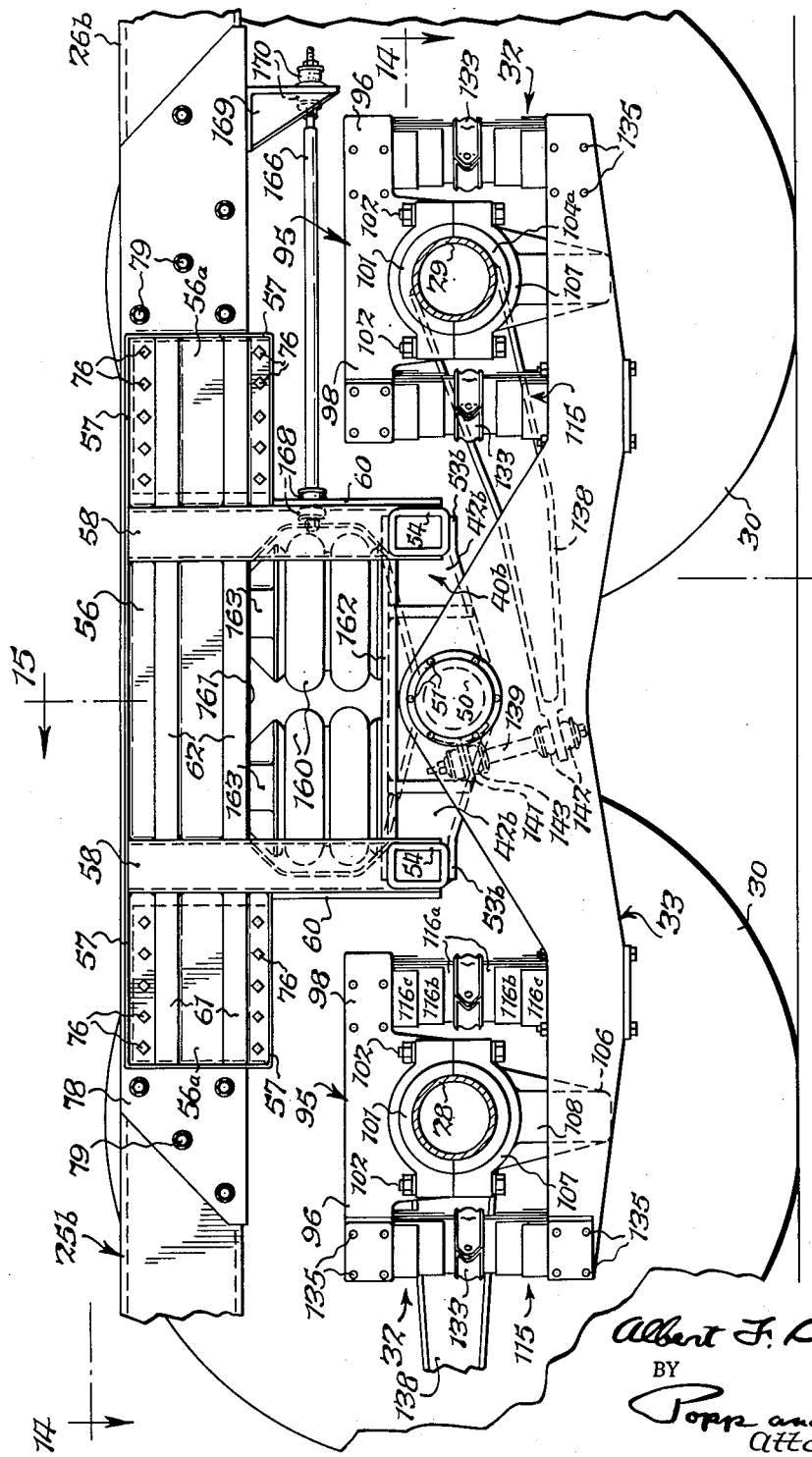
INVENTOR.
Albert F. Hickman
BY
Popp and Sommer
Attorneys.

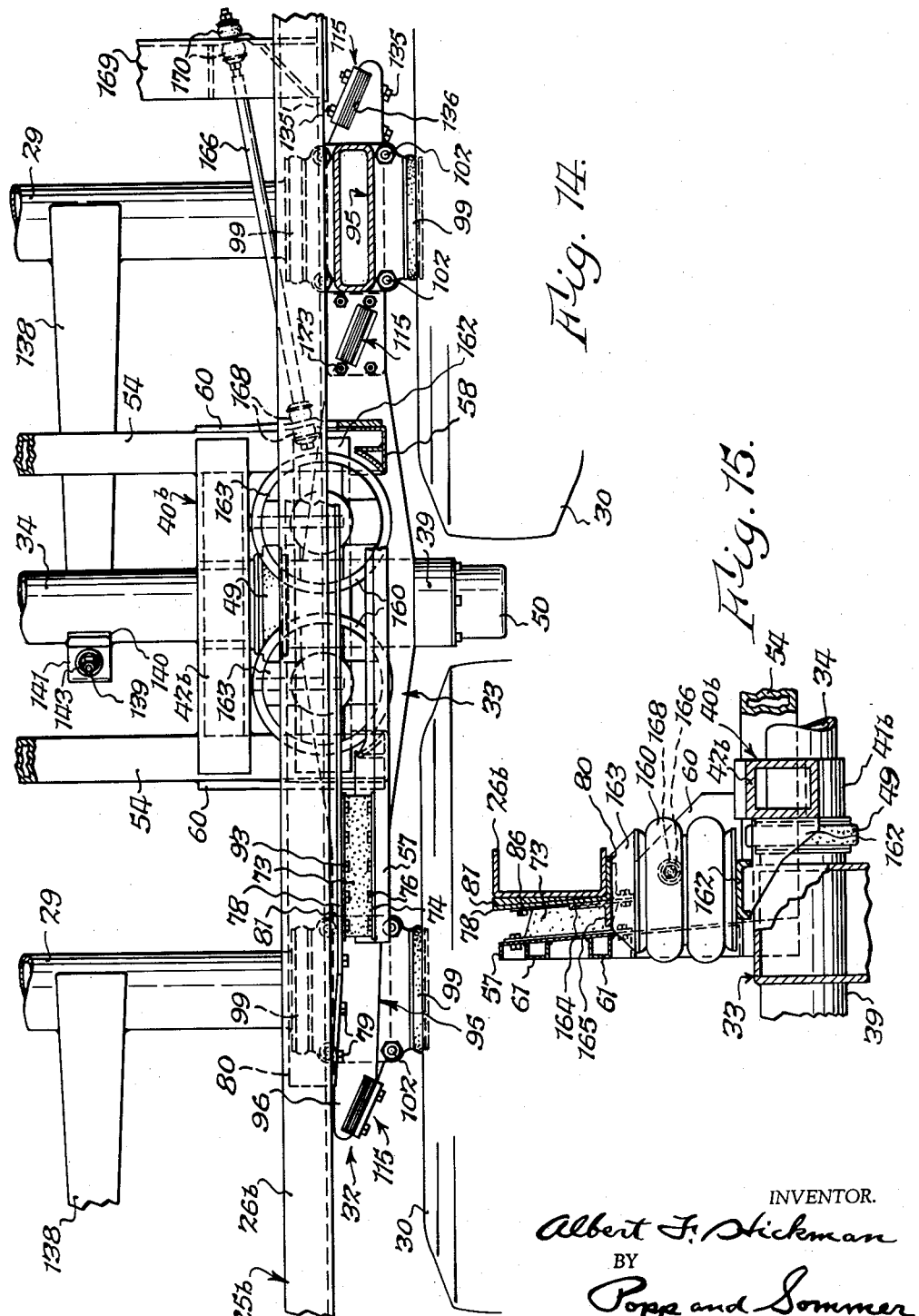

United States Patent Office
3,017,195
Patented Jan. 16, 1962

3,017,195
TANDEM AXLE SPRING SUSPENSION
Albert F. Hickman, Eden, N.Y., assignor to Hickman Developments, Inc., Eden, N.Y., a corporation of New York
Filed Feb. 18, 1959, Ser. No. 794,083
16 Claims. (Cl. 280—104.5)

This invention relates to a tandem axle spring suspension for trucks, trailers and passenger buses and more particularly to such a suspension which can be adapted to the use of rectilinear movement rubber bodies acting in shear to provide the vertical cushioning; to the use of air springs in the form of bellows containing controlled compressed air to provide the vertical cushioning; to heavy duty vehicles having wide bodies and dual tires and which, to keep within the overall maximum widths prescribed by law, leave very little room between the tires and body to accommodate a suspension; an to so-called extended wheel base tandem axles required to carry maximum loads in certain states and which have a wheel base increased from the usual 53 inches to 96 inches.

It is therefore an object of the invention to provide such a tandem axle suspension which can be designed for these three services, namely; heavy duty trucks having wide bodies and dual tires with only a few inches of space between the body and each of the dual tires; vehicles in which the vertical resiliency is provided by either rubber springs of the shear rubber, rectilinear movement type or by compressed air filled rubber bellow; and heavy duty trucks with a so-called extended wheel base tandem suspension.

Another object is to provide such a suspension which will permit the large amount of vertical axle movement required for highway vehicles to provide a vertical ride as soft as load heighths will allow and at a low frequency.

Another important object is to provide such a suspension which is substantially free from friction but is automatically controlled by an increased resistance to motion in proportion to the amplitude and velocity of vertical frame and wheel movement relative to each other.

Another important object is to provide such a suspension in which lateral and vertical movement of the axles, as well as a slight amount of movement thereof lengthwise of the vehicle frame, are permitted and resiliently resisted, the lateral and vertical resilience being sufficient, both when the vehicle is loaded and unloaded, to absorb lateral thrust of the axles, particularly resulting from one wheel moving up and down relative to the others, thereby to provide increased safety, tire and gasoline mileage, and stability.

Another object is to provide a gearless compensating means connecting the companion ends of the tandem axles and through which excess load on one wheel is transmitted to its companion wheel.

Another object is to provide such a suspension consisting of compact units which are arranged so as not to interfere with the frame and axle movement and in which the moving parts are arranged immediately inside and close to the wheels and are high enough to provide high and wide support for the body on the axles with resulting increased stability.

Another object is to provide such a tandem axle suspension in which the tandem axles are self-steering so that in rounding a curve the axles automatically assume such position relative to each other as will enable a pure rolling action to be obtained. This object is also achieved on the straightaway where some unbalance, such as one tire being of greater diameter, tends to cause tire scuffing.

Another object is to provide such a suspension which can be removed and replaced, with the axles and wheels as a unit, so that field repairs can be avoided and the hold up of trucks for repairs of their suspensions reduced to a minimum.

Another object is to avoid undesirable bond stresses on or undesired distortion of the shear rubber springs even when subjected to excessive loads.

Another object is to provide such a suspension which is substantially completely free from friction between the axles and the frame of the vehicle.

Another object is to provide such a tandem axle suspension which can have softer springs than those now on the market for equivalent duty and at the same time have greater side-sway control through high and wide spring mountings.

Another object is to provide such a tandem axle suspension having softer springs than those now on the market and which are flexible fore-and-aft of the vehicle, in which such flexibility is adequately controlled so as not to be excessive.

Another object is to provide a suspension in which the principal friction bearings can be prelubricated for the life of the vehicle.

Another aim is to provide reduced height change of the body, from empty to loaded, preferably keeping this change at about two inches, and at the same time providing a soft, low frequency ride with improved stability and side-sway control.

Another object is to provide such a suspension which can have many years and hundreds of thousands of miles of carefree operation without repairs or servicing.

Other important objects are to provide such a suspension which is very light in weight, particularly unsprung weight; in which little or no shock absorber control is required; which is low in both initial cost and upkeep; which renders auxiliary devices for the control of side-sway unnecessary; and in which periodic vibration of the suspension is dampened out.

Other objects and advantages of the invention will be apparent from the following description and accompanying drawings in which:

FIG. 3 is a fragmentary vertical section taken generally on line 3—3, FIG. 2 and showing parts in elevation.

FIG. 4 is an enlarged vertical section similar to FIG. 3 and in particular showing the annular oil seal used in connection with the suspension.

FIG. 5 is a fragmentary transverse section taken generally on line 5—5, FIG. 2 with parts in elevation.

FIG. 6 is a perspective view of the anchor used for the lower end of each of the laminated tension shackles used in the spring suspension.

FIG. 7 is a vertical section through one of the laminated tension shackles used in the suspension.

FIG. 8 is a further enlarged horizontal section taken generally on line 8—8, FIG. 7.

FIG. 9 is a fragmentary further enlarged horizontal section taken generally on line 9—9, FIG. 7.

FIG. 10 is a view similar to FIG. 1 showing a modified form of the invention and which is particularly directed to a tandem axle suspension in which the axles are more widely spaced than with the form of the invention shown in FIGS. 1 through 9.

FIG. 11 is a view similar to FIG. 2 of a modified form of the invention shown in FIG. 10.

FIG. 12 is a fragmentary, vertical section taken generally on line 12—12, FIG. 11.

FIG. 13 is a view similar to FIG. 1 of a further modified form of the invention, the form of the invention shown in FIG. 12 being particularly characterized by the use of pneumatic or air springs as the resilient support.

FIG. 14 is a view similar to FIG. 2 of the modified form of the invention shown in FIG. 13, this view being taken generally on line 14—14, FIG. 13.

FIG. 15 is a fragmentary vertical sectional view taken generally on line 15—15, FIG. 13.

FIGS. 1-9

Figure 1:
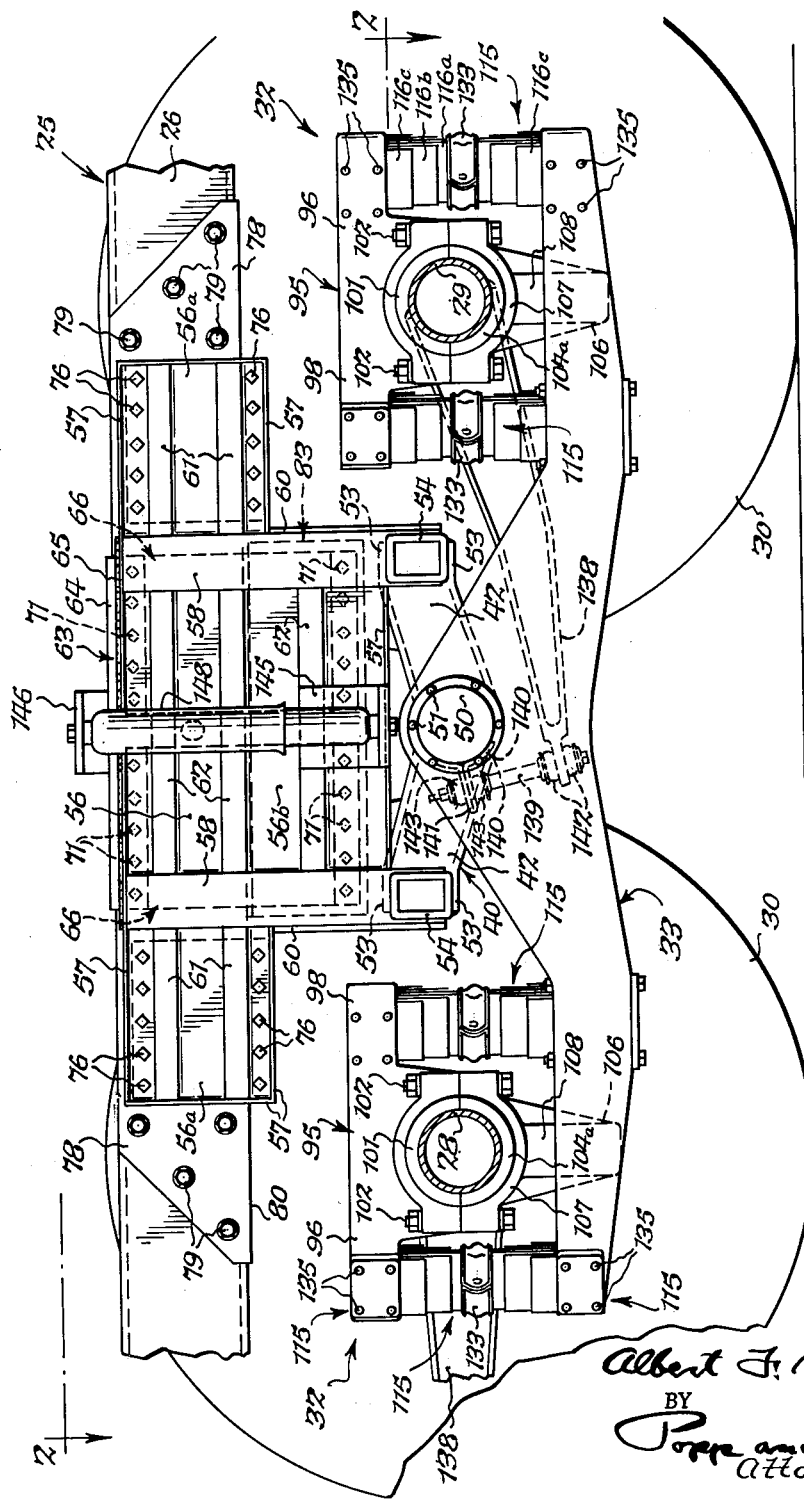
FIG. 1 is a fragmentary side elevation of the rear end of a tandem axle vehicle having a suspension embodying the present invention, the axles being shown in section and the section being taken along line 1—1 of FIG. 2.

The form of the suspension shown in FIGS. 1-9 is illustrated as being in the form of a heavy duty tandem axle suspension for wide bodied, large tired trucks or trailers. As to such wide bodied, large tired trucks, present road laws limit the maximum overall width of the highway trucks to 96 inches. Heavy duty trucks have a frame width of 34 inches and with 11 inch spaced dual tires, this leaves only from 5 to 6 inches between the tires and each side of the frame to accommodate the suspension and the space must contain enough rubber to support the load and provision must also be made to accommodate a substantial lateral axle movement, that is, at least one inch of axle movement lengthwise of its axis in either direction.

The main frame 25 of the vehicle can be of any suitable construction and is shown as comprising a pair of longitudinal side frame bars in the form of inwardly facing channels 26, which are shown as straight and parallel and are connected by the usual cross bars (not shown).

The frame is shown as supported by a pair of tandem axles 28 and 29 which in turn are supported by wheels 30, these wheels being rotatably secured on these axles. One or both groups can be drive wheels, the axle 28 being the front axle and the axle 29 being the trailing axle.

The construction of the tandem axle spring suspension at the left hand side of the truck is substantially the same as the tandem axle spring suspension at the right hand side of the truck and hence a description of the spring suspension at one side of the truck will be deemed to apply to both sides, the same reference numerals being used.

Each end of each of the axles 28, 29 is connected by a shackle structure, indicated generally at 32, to one end of a walking beam 33, these shackle structures being arranged adjacent the inner faces of the innermost wheels 30 and the walking beams 33 being in part arranged under the corresponding side frame bars 26. The shackle structures 32 constitute an important feature of the invention and will be hereinafter described in detail.

Each walking beam 33 is preferably of box form in cross section having vertical side walls and horizontal top and bottom walls, as best shown in FIG. 3. The central part of each walking beam preferably projects upwardly and is journalled on a cross tube 34, as follows:

The cross tube 34, in addition to providing the journals for the pair of walking beams 33, also forms a reservoir for a body of oil 35, FIG. 3, which is shown as being sealed in the cross tube. For this purpose a disk or plug 36 is welded in each end of the cross tube 34 and has a threaded concentric hub 38 projecting therefrom. Each walking beam 33 has a bearing or rock sleeve 39 journalled on the corresponding end of the cross tube 34 and bearing at its end against a bracket 40 having a tubular part 41 in which the cross tube 34 is secured and having front and rear arms 42 which are secured to the frame 25, preferably through one of the different forms of spring means hereinafter described. Each bearing sleeve 39 has welded within its outer end an annular disk 44, as shown in FIG. 3, which has an opening through which the threaded hub 38 of the cross tube 34 extends and which disk fits against the corresponding end of this cross tube. A nut 45 and lock nut 46 on each threaded hub 38 serves to hold the disk welded inside each bearing sleeve 39 against the corresponding end of the cross tube 34 so as to provide thrust bearings for the bearing sleeve 39 at opposite ends of the cross tube 34 although these thrust forces are comparatively slight except under extremely distorted conditions such as when the spring suspension is under a trailer and the trailer and its tractor have jack-knifed so as to impose severe lateral strains upon the trailer suspension.

Oil from the body 35 is supplied to the internal bearing surface of each tubular bearing or rock sleeve 39. For this purpose the cross tube 34 can be provided at each end with oil holes 48 leading from its interior to the interior of each rock sleeve 39. An oil seal 49 is shown as surrounding the abutting ends of each rock sleeve 39 and the cylindrical part 41 of each bracket 40. The oil seal can be of any suitable form but is shown as made of a tube of flexible material with reduced ends bound or otherwise removably secured to the abutting ends of each rock sleeve 39 and tubular part 41 of each bracket 40, and having a radially enlarging central portion which permits rocking movement of each rock sleeve 39 without undue distortion of the oil seal 49. The oil seal at the outboard end of each rock sleeve 39 is in the form of a hub cap 50 which surrounds the corresponding hub 38 and its nuts 45, 46 and has its rim secured, as by screws 51 to the end of the corresponding rock sleeve 39.

Figure 2:
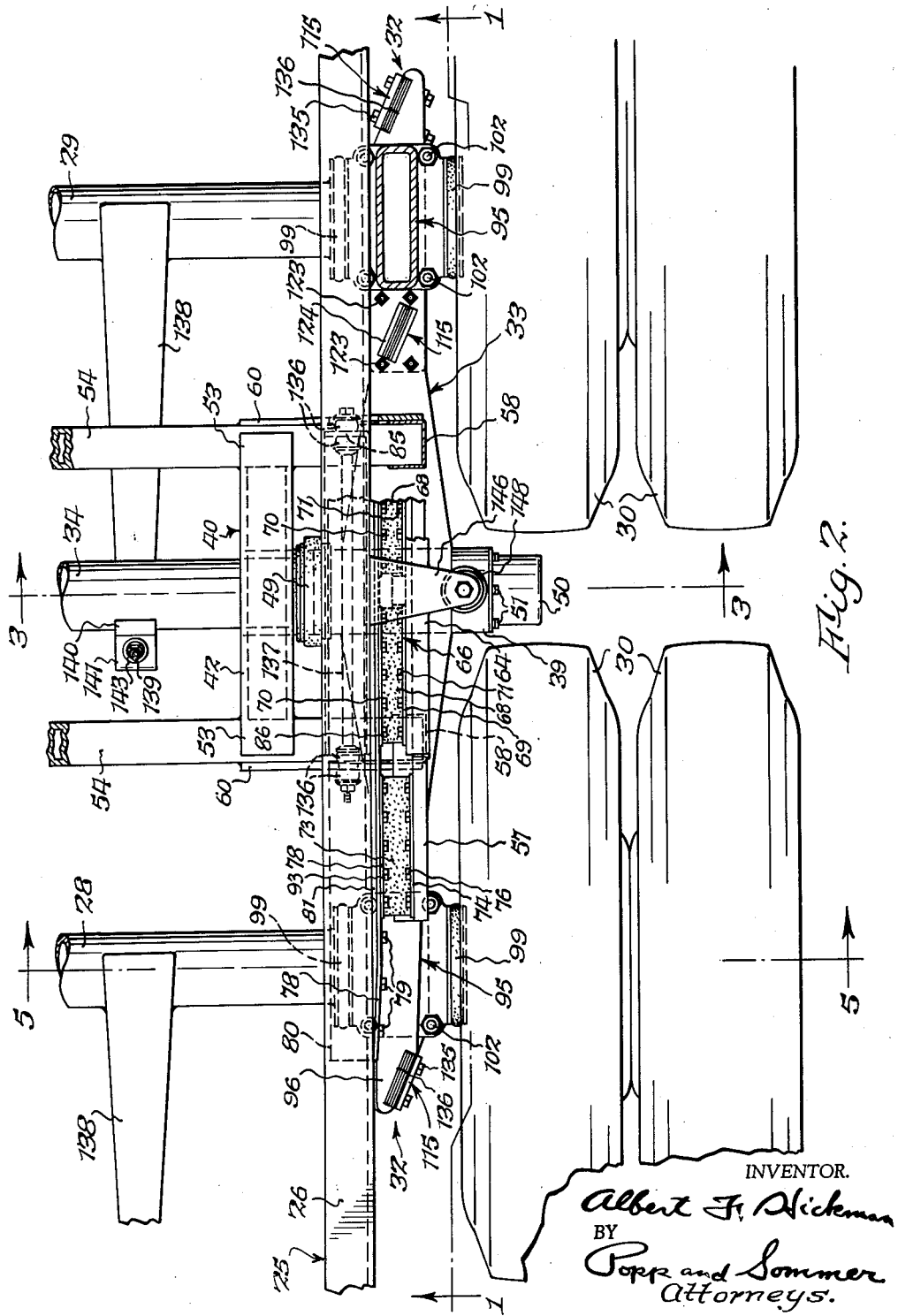
FIG. 2 is a fragmentary combined top plan and horizontal sectional view of one side of the suspension shown in FIG. 1, this section being taken generally on line 2—2, FIG. 1 and the other side of the suspension being of substantially identical construction.

With the form of the invention shown in FIGS. 1-9 the spring means interposed between each end of the cross tube 34 and the corresponding main longitudinal side frame bar 26 of the chassis 25 is in the form of a group of rectilinear movement shear rubber bodies at each side of the vehicle frame 25 and which are shown as constructed and mounted as follows:

The fore-and-aft extremities of the arms 42 of each bracket 40 fast to the opposite ends of the cross tube 34 are bifurcated to provide square jaws 53. In these jaws are welded cross bars 54 which are preferably of tubular rectangular cross section, as shown. These cross bars 54 are arranged so that the forward one connects the forwardly extending arms 42 of the two brackets 40 and the rearward cross tube 54 connects the rearwardly extending arms 42 of these brackets. The ends of the rectangular cross bars 54 also project beyond the brackets 40 and beyond the main longitudinal side frame bars 26 as best shown in FIGS. 2 and 3.

Secured to the outboard ends of the rectangular cross bars 54 at each side of the vehicle is an upright metal plate 56 which is T-shaped in side elevation having upper extensions 56a extending lengthwise of the vehicle fore-and-aft and having a depending base part 56b or central downward extension and having its margin outwardly flanged as indicated at 57. To the outer face of each of these plates 56 is welded a pair of large vertical ribs 58 which are preferably rectangular in cross section and aline with the rectangular cross bars 54. The lower end 59 of each of these vertical ribs extends below its plate 56 and is bifurcated to provide a square jaw which embraces and is welded to the corresponding end of a companion rectangular cross tube 54. These depending lower ends of the vertical ribs 58 are preferably reinforced by gusset plates 60 which are welded to these lower ends and also to the rectangular cross bars 54 as shown in FIGS. 1, 2, and 3. The horizontal extensions 56a are suitably reinforced by horizontal ribs 61 these being welded to the extensions 56a as well as to the large vertical ribs 58 and marginal flange 57. The central part of the T-shaped plate 56 is reinforced by horizontal ribs 62 which are welded to the plate and are also welded at their ends to the struts 58.

The plates 56 incline so as to converge downwardly with reference to each other but are parallel with the main longitudinal side frame bars 26 in a horizontal direction. The central part of each of these plates 56 carries a rectangular reinforcing plate 63 which is arranged against the inner face of the corresponding plate 56 and has an upper flange 64 which extends outwardly over the upper part of the marginal flange 57 of the plate 56, a strip of rubber 65 (FIG. 3) being shown as interposed between these flanges 64, 57.

Each reinforcing plate 63 forms the backup plate for a pair of main rubber springs indicated generally at 66. These rubber springs are arranged side by side fore-and-aft of the chassis and each comprises a rectangular body 68 of rubber sandwiched between and vulcanized to a pair of rectangular plates 69 and 70. Each of the outer rectangular plates 69 is secured by upper and lower rows of bolts 71 to the reinforcing plate 63 and central part of the T-shaped plate 56.

A pair of lighter rectilinear movement shear rubber springs 72 is secured to each of the horizontal extensions 56a of the plate 56. Each of these lighter springs consists of a rectangular rubber body 73 sandwiched between and vulcanized to a pair of rectangular metal plates 74, 75. The outer pair, 74 of these metal plates is secured by upper and lower horizontal rows of bolts 76 to the horizontal extensions 56a of the T-shaped plate 56 as best shown in FIGS. 1, 2 and 5.

The inner plates 70 of the main rectilinear movement shear rubber springs 66 are secured to the corresponding main longitudinal side frame bars 26. For this purpose a side plate 78 is secured to the outer face of each of the main longitudinal side frame bars 26 by bolts 79 or in any other suitable manner as shown at the left of FIG. 3, the ends of these plates 78 extending beyond the axles 28, 29 as shown in FIG. 1. The lower side of each of these plates 78 is flanged inwardly, as indicated at 80, FIGS. 3 and 5 and these flanges 80 fit against the undersides of the main longitudinal side frame bars 26. These plates are disposed parallel with the T-shaped plates 56, that is, they converge downwardly and to obtain this convergence wedge-shaped filler pieces 81 are interposed between these plates 78 and the outer faces of this main longitudinal side frame bar 26.

To accommodate the heavier springs 66, the upper flanges 82 of L-shaped brackets 83 are secured to the undersides of the main longitudinal side frame bars 26 and their depending parts 84 project downwardly and form continuations of the side plates 78. Each bracket can be suitably reinforced by gusset plates 85. The inner plates 70 to which the larger rubber bodies are vulcanized are secured to the chassis 25 by an upper row of bolts 86 and by a lower row of bolts 88. The upper row of bolts 86 pass through the upper extremities of the plates 70 to which the rubber bodies 68 are vulcanized; the side plate 78; the wedge-shaped filler piece 81; and the main longitudinal side frame bar 26, all as shown in FIG. 3. Each lower row of bolts 88 extend through the plate 70 to which each rubber body 68 is vulcanized and through the lower extremity of the bracket 83.

To secure the inner plates 75 of the lighter shear rubber rectilinear movement rubber springs 72 to the chassis, a pair of L-shaped brackets 90 are welded to the undersides of each main longitudinal side frame bar 26 behind each of these plates 75 and these plates are secured to downward extensions 91 of these brackets by bolts 92, all as best shown in FIG. 5. The wedge-shaped filler plate 81 is of sufficient length to extend behind the plate 75 and each of these plates 75 is secured by an upper row of bolts 93 which extend through these plates; the wedge-shaped filler pieces 81 and the web of the longitudinal side frame bar 26.

As previously indicated, the form and arrangement of the shackle structure 32 between each axle end and the corresponding end of the walking beam 33 forms an important feature of the invention, both alone and in combination with other features.

Each of these shackle structures includes an upright T-shaped axle bracket 95 having its central part securely fixed to the top of the corresponding axle 28 or 29 and having arms 96, 98 projecting horizontally fore-and-aft of the vehicle, from the central part. As best shown in FIGS. 1 and 5 each axle bracket is centrally provided in its underside with a semicircular recess lined with a semicircular sheet metal liner 98, provided with a semicylindrical liner 99 of rubber or the like soft, resilient material. This rubber liner is contained within a semicylindrical holder 100 having radially outwardly projecting flanges 101 which retain the rubber liner 99 against axial displacement. Each holder 100 is preferably secured to the upper half of the corresponding axle and by welding. Each bracket 95 is clamped to the corresponding axle end by a semicylindrical metal clamping member 107 and vertical bolts 102 which draw the axle bracket 95 and clamping member 98 into clamping engagement with the axle end. Each semicylindrical clamping member 107 has an upwardly facing conical recess lined with a semicylindrical sheet metal liner provided with a semicylindrical liner 103 of rubber or other soft resilient material. This rubber liner is contained within a semicylindrical holder 104 preferably welded to the underside of the corresponding axle end and having end flanges 104a which hold the rubber liner 103 against axial displacement.

Each clamping member 107 also has an integral downwardly projecting stop 106 providing an outer flap stop face 108 opposing the inner side of the corresponding end of the walking beam 33. The stop 106 is sufficiently heavy and adequately reinforced to limit the lateral movement of the ends of the walking beams 33 to the spaces provided between the walking beams and the stop faces 108. These faces engage only under extreme conditions.

The arms 98 of the axle brackets 95 at each side of the vehicle project toward each other and are connected to the corresponding ends of the walking beams by tension leaf spring shackles indicated generally at 115. Each of these leaf spring shackles comprises a flat central spring leaf 116 flanked by a pair of full length spring leaves 116a, each of which has a horizontal outwardly protruding corrugation 117 at its center. The full length leaves 116a are in turn flanked at their opposite ends by progressively shorter spring leaves 116b and 116c. The upper group of spring leaves is secured to the corresponding end 98 of the axle bracket 95 by a plurality of bolts 118, four being shown. In addition to passing through the upper group of spring leaves and the arm 98 of the axle bracket 95, these bolts 118 also pass through clamping plates 119.

To secure the lower group of leaves of the tension spring shackles 115 to the walking beams, the upper and lower walls of each walking beam 33 are provided with slots severally in vertical alinement with the shackles 115. In each pair of these slots is arranged an anchor piece 120 illustrated in perspective in FIG. 6. This anchor piece comprises a horizontal bottom plate 121 having four corner holes 122 adapted to receive bolts 123 which clamp this bottom plate to the underside of the corresponding walking beam and, these bolts extending through the bottom and top walls of the walking beams 33 as best shown in FIG. 7. Each anchor piece 120 also includes a pair of closely spaced upstanding walls 124. These walls extend through the corresponding pair of slots provided in each walking beam end and embrace the group of spring leaves at the lower end of each leaf spring shackle 115. The group of springs at the lower end of each leaf spring shackle 115 are preferably secured between the upstanding walls 124 of the anchor piece 120 by rivets 125 or in any other suitable manner.

A similar leaf spring shackle 115 connects the arm 96 of each axle bracket 32 with the extremity of each walking beam 33 and the description of these shackles will therefore not be repeated. However, instead of anchoring the lower ends of these leaf spring shackles to an anchor piece 120 as shown in perspective in FIG. 6, the lower ends of these outboard leaf spring shackles are bolted directly to the sides of the extremities of the walking beams by bolts 135, the extremities of the walking beams being recessed as indicated at 136, FIG. 2, to receive the lower ends of these leaf spring shackles. The top end of each leaf spring shackle 115 is shown as secured to the corresponding arm 96 or 98 of the axle bracket 95 by bolts 135 and 118, respectively in the same manner as the lower ends of the outboard shackles 115.

The transverse corrugations or offsets 117 at the centers of the leaves 116a flank the center leaf 116 to accommodate the situation where one of the four dual wheels 30 rises relative to the other three. Thus, if there were only lateral movement of the leaf springs transversely of the plane of the center spring 116, the flanking leaves 116a could be straight and the corrugations 117 would be unnecessary. However, when one dual wheel 30 and its axle end rises relative to the other three, one flanking leaf 116a is placed under tension and the other placed under compression and corresponding elongation and shortening of these leaves 116a relative to each other must take place. This is, of course, permitted by the corrugations 117. These two flanking leaves 116a are fully effective in resisting forces which are fore-and-aft with respect to the vehicle and are also fully effective, of course, if the center leaf 116 should break.

In addition the corrugated side leaves are rendered effective in regular service in direct tension in assistance to the center leaf 116. This is accomplished by a spring clip 130 in the form of a two-part housing, the two cup-shaped parts 130a of which are held together by bolts 131 which pass through mating flanges 132 of the two halves. The two halves 130a jointly provide cylindrical housing 133 having upper and lower slots provided by jaws 134. The leaves 116 and 116a are contained within these slots and the jaws 134 bear against the opposite outer faces of the leaves 116a above and below their corrugations 117 so as to frictionally couple these leaves 116a to the center leaf 116 and add their effect to the tension strength of the center leaf. The clips 130 greatly increase the strength in tension of the spring shackles 32 in tension and at the same time permit the microscopic elongation and shortening of the leaves 116a when one wheel rises relative to the others.

In the event the rubber bodies 68, 73 provide excessive resilience lengthwise of the chassis, such longitudinal resiliency can be limited by suitable radius rods 137. Each radius rod is shown as extending lengthwise of the chassis below the corresponding main longitudinal side beam 26 and as anchored at one end to a gusset plate 60 and at its other end to the chassis. In each instance the connection is through rubber washers or beads 136 so that these radius rods provide a limited resiliency, lengthwise of the chassis, for the axles.

The suspension is shown in FIGS. 1–9 as completed by axle torque arms 138 which are effective against brake and drive torque reactions. Each arm 138 is welded to each axle 28, 29 near the center thereof to project generally horizontally toward the front of the vehicle. The torque arm 138 of the trailing tandem axle 29 can be connected by a generally vertical rod 139 to the cross shaft 34, the cross shaft being provided with a wrap-around attachment bracket 140 for this purpose with mating end flanges 141 through which the rod 139 extends. Preferably the vertical force of the torque arm is transmitted through a pair of rubber cushion washers 142 to the rod 139 and the vertical force of this rod is delivered to the bracket 140 through a pair of cushion washers 143.

The outboard end of the front torque arm 138 can be connected by a similar rod 139 to the frame or chassis 25 in any suitable manner (not shown).

With friction free spring suspensions such as the present suspension, periodic body roll has been experienced in some instances, this being a roll from side to side at a frequency of about 30 cycles per minute. Such periodic body roll can readily be prevented in the suspension forming the present invention. Thus, a bracket 145 can be attached to the lower part of each upright metal plate 56 to project horizontally outwardly therefrom. A bracket 146 can be attached to the frame 25 to project horizontally outwardly therefrom directly above the bracket 145. A telescopic shock absorber 148 can be attached at its opposite ends to these brackets and it will be seen that these shock absorbers will inhibit the start of such roll frequencies, particularly in that the shock absorbers 148 are located far outboard with reference to the center of the vehicle.

*Operation*

Referring more particularly to the form of the invention shown in FIGS. 1–9, in the operation of the suspension the upward movement of one end, say, the front tandem axle 28, effects upward movement of the T-shaped axle bracket 95 fixed thereon thereby to place the corresponding pair of leaf spring shackles 115 under tension to effect upward movement of the front end of the walking beam 33. This force through the leaf spring shackles is essentially transmitted through the center leaf 116 thereof but in part is transmitted through the flanking leaves 116a by reason of the spring clips 130 which press these leaves together above and below their corrugations 117. These corrugations permit the required elongation of one leaf 116a and shortening of the other leaf 116a when one axle end rises relative to the other axle end which is the condition assumed in this description of the operation.

This upward movement of the forward end of the walking beam 33 raises its rock sleeve 39 (FIG. 3) at the center of the walking beam and which is journalled on the corresponding end of the cross tube 34. This bearing is supplied with lubricant from the body 35 of oil in the cross tube via the bottom holes 48 therein and the body of oil 35 is held against escape by the welded internal disk or end head 36 and flexible oil seal 49. This bearing mounting of the rock sleeve 39, which is fast to the center of the walking beam, permits the assumed upward movement of the front end of the walking beam and also transmits this upward movement to the corresponding end of the cross tube 34.

This upward movement of one end of the cross tube 34 is transmitted through the fore-and-aft arms 42 of the bracket 40 welded on this end of the cross tube 34 to the corresponding ends of the pair of rectangular cross bars 54. Through the vertical ribs 58, the jaws 59 at the lower ends of which embrace the ends of the bars 54, this raises the T-shaped plate 56.

This upward movement of the T-shaped plate 56 is resisted by the four rubber bodies 68 and 73, the outer faces of which are forced upwardly with such rectilinear forces acting in shear, the inner faces of those rubber bodies being anchored to the chassis 25 of the vehicle.

Accordingly, the upward movement of one wheel of the tandem axle suspension is cushioned by the four rubber bodies 68 and 73 at that side of the vehicle before being transmitted to the chassis and also load transfer from one wheel to the other is effected through the walking beam, that is, the walking beam 33, if journalled at its exact center insures equal loading of its two wheels 30 so that a sudden load, as from a bump in the road, on one wheel is immediately transferred through the walking beam to the companion wheel 30.

By the downwardly converging arrangement of the rubber bodies 68 and 73 with reference to the rubber bodies on the other side of the vehicle, the rubber bodies are put under compression when placed under load so there is no tendency of the load to weaken the vulcanized bond between the rubber bodies and their side plates because of any pulling of these rubber bodies from their plates which otherwise could arise.

With the rubber bodies 68, 73 at one side of the vehicle so converging downwardly with reference to the rubber bodies at the other side of the vehicle, while the suspension is friction free, this convergence provides automatically increased resistance to downward movement of the body in proportion to the amplitude and velocity of vertical frame and wheel movement relative to each other.

Lateral cushioning of the axles 28, 29 is also provided by the leaf spring shackles 115. Thus, either axle can move lengthwise of its axis, this being permitted by the leaves of these leaf spring shackles, and these spring shackles yieldingly return the chassis to centered relation when normal conditions are restored. It will particularly be noted that since the leaf spring shackles 115 are between the axles and the walking beams, there is minimum inertia resistance to such lateral movement of the axles, the only inertia being that of the individual axles themselves.

The amount of such lateral movement of each axle is positively limited. Thus excessive movement of either axle lengthwise of its axis will cause its stop 106 (FIG. 5) to engage the corresponding walking beam 33. The tires are thereby prevented from being cut by contacting any part of the suspension.

An important feature is also that the axles are self-steering, that is, they move laterally to trail the steering wheels and trail each other as the vehicle is steering around curves and in and out of traffic. This self-steering is obtained through the angularity, in a horizontal direction, of the leaf springs shackles 115. Thus, as best shown in FIG. 2, the leaves of these leaf spring shackles toe in toward the front of the vehicle, the leaves of the leaf spring shackles at each side of the vehicle being parallel.

When the vehicle makes a turn in the road, the tires of each of the axles 28, 29 tend to resist the scuffing which would otherwise occur and in doing so push each axle laterally of the frame to eliminate this scuffing. Confining our attention to, say, the front axle 28, this lateral or axial movement on making a turn displaces the four pairs of spring leaves 116 horizontally, these spring leaves 116 at one side of the vehicle being displaced horizontally toward the frame 25 and at the other side of the vehicle being displaced away from the frame 25. Since these leaves 116 are set at an angle and since the leaves 116 at opposite sides of the vehicle are set at opposite angles in a horizontal direction so that all of these leaves toe in toward the front of the vehicle, it will be seen that such assumed lateral movement of the front axle 28 causes one of its ends to be displaced forwardly and its other end to be displaced rearwardly.

It will therefore be seen that such endwise displacement of each tandem axle 28, 29 will cause a corresponding opposite displacement, fore-and-aft of the frame, of the opposite ends thereof. Thus, fore-and-aft displacement of the two tandem axles 28, 29 is such that in rounding a curve and with such endwise displacement of the axles 28, 29 to avoid tire scuffing, both of the tandem axles are caused to steer in the direction to correspond to the turn being made by the vehicle. Thus, when the vehicle is steered to the right, the front end of the body moves about a theoretical pivot intermediate the tandem axles. This causes a lateral movement of the body in opposite directions relative to the two tandem axles, the body movement being to the right relative to the front tandem axle 28 and to the left relative to the rear tandem axle 29. This causes the left hand end of the front tandem axle 29 to move forwardly and the right hand end of this front tandem axle to move rearwardly. This also causes the left hand end of the rear tandem axle 29 to move rearwardly and the right hand end of the rear tandem axle to move forwardly. The movement therefore tends to bring the axes of the tandem axles 28, 29 so as to intersect the axes of the front steering wheels (not shown) and thereby enable the truck to make the turn without tire scuffing. Equally important is that the self-steering feature tends to hold the wheels in perfect rolling alinement when travelling straight ahead. This self-steering action also takes place to some extent when a tendency to tire scuffing occurs because of one wheel or a pair of wheels having a diameter different from the diameter of the wheel or pair of wheels at the other end of the same axle.

The form of the invention shown in FIGS. 1–9 is particularly designed as the tandem axle suspension of the rear end of a wide bodied, large dual tired truck, especially a truck having a wide frame, such as a 34 inch frame, and large tires, such as 11 inch tires, and the frame and tires having 96 inch overall dimension, which is the usual maximum overall dimension permitted by law. With such maximum overall dimension, and with such large sized frame and tires, the room between the tires and the frame, and in which the suspension must be accommodated, is very limited, being only from 5 to 6 inches. In this space of 5 to 6 inches, with a shear rubber spring suspension, it is necessary to put enough rubber to carry the maximum load and it is also necessary additionally to allow 2 inches of lateral movement of each axle, that is, an inch in each direction. Because of such conditions imposed on the design of a wide frame large size truck it is necessary to reduce the size of the shear rubber bodies in a direction lengthwise of the axle to values which will fit within the 5 or 6 inch space between the frame and the tires. With such reduction of the size of these shear rubber bodies, and with limitations imposed on their vertical dimensions, it was found that the required increase in total face area of the rubber bodies could be achieved only by the form and arrangement shown, that is by having a T-shaped flat, generally vertical plate 68, centrally above the axis of the walking beam 33 and having its central part 56b acting through one or more rubber bodies 68 which are deep in a vertical direction and having its arms 56a acting through rubber bodies which are of lesser height.

The torque arms 138 fixed to each axle adequately resist all brake and drive torque reactions and through the rod and rubber bushing connection 139, 142, 143 do not resist axle movement in any direction, this being under control of the suspension.

The shock absorbers 148 inhibit any tendency to periodic body roll such as has been experienced with frictionless suspensions.

By the high and wide mounting for the shear rubber bodies, excellent sidesway control and stability is achieved even with the soft, low frequency ride which these bodies provide.

*FIGS. 10–12*

Certain States require that for maximum loads the wheel base of the tandem wheels be 96 inches as compared with the usual 53 inches. Such a large wheel base tandem suspension is commonly called an extended wheel base tandem and is illustrated in FIGS. 10–12.

The principal modification of the invention to provide such an extended wheel base tandem suspension is, of course, the increased length of the walking beam 33a as compared with the walking beam 33 in the form of the invention shown in FIGS. 1–9, but in addition added control is required against movement of the ends of the longer walking beam 33a transversely of the frame in order not to increase corner loads on the cross shaft journal bearings and also to provide the required stability and control.

To this end the main longitudinal side frame bars 26a of the chassis 25a are shown as connected, between the axles and the axis of oscillation of the walking beam 33a, with a pair of channels 150 to the center of each is secured a downwardly projecting inverted pedestal or post 151. Below the outer ends these frame channels 150, each end of each walking beam is provided with a ball joint member 152 having universal connection with a radius rod 153. The other end of each radius rod 153 has universal connection with a ball joint member 154 fixed to the bottom of the corresponding cross inverted pedestal or post 151. A feature of the form of the invention shown in FIGS. 10–12 is that in the normal loaded position of the vehicle, the radius rods 153 are in a horizontal plane, so that these radius rods move both up and down from the horizontal and hence have a minimum spreading effect upon the walking beams 33α during such movement. This limited spreading effect is compensated for by slippage provided in the main bearing for each walking beam 33a. Thus, the rock sleeve 39a in the form of the invention shown in FIGS. 10–12 is somewhat shorter than the rock sleeve 39 of the form of the invention shown in FIGS. 1–9 so as to leave a space 155 as shown in FIG. 12 for endwise movement of the bearing sleeve to accommodate spreading and contracting movement of the walking beams 33a in response to change in effective length of the radius rods 153 as the ends of the walking beams move up and down.

It will be seen that these radius rods 153 adequately hold the ends of each walking beam 33a against horizontal lateral displacement to prevent corner loading for this bearing.

Since in other respects the extended wheel base tandem suspension shown in FIGS. 10–12 is identical to that shown in FIGS. 1–9, the same reference numerals have been employed and the description will not be repeated.

FIGS. 13–15

In this form of the invention the major resilient support for this chassis 25b are air springs in the form of corrugated bellows 160 containing compressed air. An advantage in the use of such air springs is that for adjusting the internal pressure in such air springs, the height or level of the chassis can be maintained constant. Accordingly, if the 2 inch variation in height which follows loading the form of the invention shown in FIGS. 1–9 should be undesirable, the air spring form of the invention shown in FIGS. 13–15 can be used.

In this form, to accommodate a pair of air springs 160 the depending base part 56b of the plate 56 as shown in FIGS. 1–9 is removed, together with the lowermost horizontal rib 62. This leaves a window 161 in the lower part of the plate 56 through which the air springs 160 project as shown in FIG. 15.

These air springs 160 are seated on a lateral extension 162 of the bracket 40b which corresponds to the bracket 40 in the form of the invention shown in FIGS. 1–9 having arms 42b provided with horizontal end jaws 53b which embrace and are welded to the ends of the tubular cross bars 54. The bracket 40b has a top plate on which the pair of air springs are seated.

Each air spring 160 is shown as having a metal cap 163 the tops of which bear against the underside of the horizontal bottom flange 80 of the corresponding plate 78. An additional bracket 164 having a bottom horizontal flange 165 can be secured to supplement the flange 80.

Instead of the radius rods 135, the invention is shown in FIGS. 13–15 as having a radius rod 166 interposed between each end of one of the tubular cross bars 54 and the chassis 25b extend fore-and-aft of the chassis. This radius rod is shown as extending through the gusset plate 60 of the rear cross bar 54 and through two rubber washers or beads 168 which are suitably held in compressive relation with opposite sides of this gusset. The other end of each radius rod 166 extends through a flange or web of a frame cross bar 169 and through two additional rubber washers or beads 170 which are suitably held in compressive relation with opposite sides of this web or flange.

Since in other respects the form of the invention shown in FIGS. 13–15 is identical to that shown in FIGS. 1–9, the same reference numerals have been employed and the description is not repeated.

From the foregoing it will be seen that the present invention achieves the objects and has the advantages set forth, and is a sturdy, low cost suspension free from upkeep and service problems.

I claim:

1. A tandem axle spring suspension adapted to be interposed between a vehicle main frame and a pair of tandem axles each having wheels journalled at the ends thereof, comprising a walking beam arranged at each side of said main frame and extending lengthwise thereof, a supporting bracket adjacent the center of each walking beam, a pair of generally parallel, horizontal cross bars fixed to and rigidly connecting said brackets at their front and rear ends and arranged in fore-and-aft spaced relation with reference to said main frame, a cross tube fixed to and rigidly connecting said brackets and arranged intermediate and generally parallel to said cross bars, said brackets and their connecting cross tube forming a transverse subframe intermediate said main frame and walking beams, bearing means supporting each end of said cross tube on the central part of each walking beam to permit said walking beam to oscillate about the axis of said cross tube, spring means supporting said main frame on each of said brackets for vertical movement relative thereto, and means movably connecting each end of each walking beam to the corresponding axle end.

2. A tandem axle spring suspension adapted to be interposed between a vehicle main frame and a pair of tandem axles each having wheels journalled at the ends thereof, comprising a walking beam arranged at each side of said main frame and extending lengthwise thereof, a supporting bracket adjacent the center of each walking beam, means rigidly connecting said brackets together to form a transverse subframe, bearing means rigidly connecting the central part of each walking beam to the corresponding bracket to rotate about a horizontal transverse axis, a plate projecting upwardly from each bracket and extending lengthwise of the vehicle main frame, a plurality of rubber bodies connecting one face of each plate with said main frame and distorted upwardly in shear in yieldingly supporting said main frame, and means movably connecting each end of each walking beam to a corresponding axle end.

3. A tandem axle spring suspension adapted to be interposed between a vehicle main frame and a pair of tandem axles each having wheels journalled at the ends thereof, comprising a walking beam arranged at each side of said main frame and extending lengthwise thereof, a supporting bracket adjacent the center of each walking beam, means rigidly connecting said brackets together to form a transverse subframe, bearing means rigidly connecting the central part of each walking beam to the corresponding bracket to rotate about a horizontal transverse axis, a plate projecting upwardly from each bracket between said wheels and the outer side of said main frame and extending lengthwise of said main frame, a plurality of rubber bodies connecting the said outer side of said main frame with the opposing face of each plate and distorted upwardly in shear in yieldingly supporting said main frame, and means movably connecting each end of each walking beam to a corresponding axle end.

4. A tandem axle spring suspension adapted to be interposed between a vehicle frame and a pair of tandem axles each having wheels journalled at the ends thereof, comprising a walking beam arranged at each side of said frame and extending lengthwise thereof, a supporting bracket adjacent the center of each walking beam, means connecting said brackets together, bearing means connecting the central part of each walking beam to the corresponding bracket to rotate about a horizontal transverse axis, a plate of T-shaped form in elevation projecting upwardly from each bracket between said wheels and the outer side of said frame in generally centered relation to said bearing means and arranged in an upright plane extending lengthwise of said frame, at least one rubber body connecting the outer side of said frame with the central part of the opposing face of said T-shaped plate, another rubber body connecting the outer side of said frame with the opposing face of said T-shaped plate on each fore-and-aft side of said one rubber body, said one rubber body being of substantially greater extent in a vertical direction than said another rubber body, and means movably connecting each end of each walking beam to a corresponding axle.

5. A tandem axle spring suspension adapted to be interposed between a vehicle main frame and a pair of tandem axles each having wheels journalled at the opposite ends thereof, comprising a walking beam arranged at each side of said main frame and extending lengthwise thereof, a supporting bracket adjacent the center of each walking beam, a pair of generally parallel, horizontal cross bars fixed to and rigidly connecting said brackets at their front and rear ends and arranged in fore-and-aft spaced relation with reference to said main frame, a cross tube fixed to and rigidly connecting said brackets and arranged intermediate and generally parallel to said cross bars, said brackets and their connecting cross tube forming a transverse subframe intermediate said main frame and walking beams, bearing means supporting each end of said cross tube on the central part of said walking beam to permit said walking beam to oscillate about the axis of said cross tube, a plate projecting upwardly from each bracket between said wheels and the outer side of said main frame and extending lengthwise of said main frame, a plurality of rubber bodies connecting said outer side of said main frame with the opposing face of each plate and distorted upwardly in shear in yieldingly supporting said main frame, and means movably connecting each end of each walking beam to a corresponding axle end.

6. A tandem axle spring suspension adapted to be interposed between a vehicle main frame and a pair of tandem axles each having wheels journalled at the ends thereof, comprising a walking beam arranged at each side of said main frame and extending lengthwise thereof, a supporting bracket adjacent the center of each walking beam, means rigidly connecting said brackets together to form a transverse subframe, bearing means rigidly connecting the central part of each walking beam to the corresponding end of said subframe to rotate about a horizontal transverse axis, a hollow rubber body containing compressed air seated on each bracket and supporting said main frame, means guiding and constraining the movement of said subframe relative to said main frame, and means movably connecting each end of each walking beam to a corresponding axle end.

7. A tandem axle spring suspension adapted to be interposed between a vehicle frame and a pair of tandem axles each having wheels journalled at the ends thereof, comprising a walking beam arranged at each side of said frame and extending lengthwise thereof, a supporting bracket adjacent the center of each walking beam, means connecting said brackets together, bearing means connecting the central part of each walking beam to the corresponding bracket to rotate about a horizontal transverse axis, a hollow rubber body containing compressed air seated on each bracket and supporting said frame, a plate projecting upwardly from each bracket and extending lengthwise of the vehicle frame, at least one rubber body connecting one face of each plate with said frame and distorted upwardly in shear in yieldingly assisting said air filled rubber bodies in supporting said frame, and means movably connecting each end of each walking beam to a corresponding axle end.

8. A tandem axle spring suspension adapted to be interposed between a vehicle frame and a pair of tandem axles each having wheels journalled at the ends thereof, comprising a walking beam arranged at each side of said frame and extending lengthwise thereof, bearing means connecting the central part of each walking beam to the corresponding side of said frame to oscillate about a horizontal transverse axis, and at least one tension leaf spring connected at its upper end to each end of each axle and at its lower end to the adjacent end of a corresponding walking beam and arranged in a vertical plane extending lengthwise of its frame to permit lateral movement of said frame with reference to said walking beams.

9. A tandem axle suspension as set forth in claim 8 wherein said planes of said tension leaf spring at one side of the vehicle toe in toward the front of the vehicle with reference to said planes of the tension leaf springs at the other side of the vehicle to render said tandem axles self-steering.

10. A tandem axle spring suspension adapted to be interposed between a vehicle frame and a pair of tandem axles each having wheels journalled at the ends thereof, comprising a walking beam arranged at each side of said frame and extending lengthwise thereof, bearing means connecting the central part of each walking beam to the corresponding side of said frame to oscillate about a horizontal transverse axis, an axle bracket on each end of each axle and adjacent an end of a corresponding walking beam, a pair of tension leaf springs spaced fore-and-aft of each axle and connected at their upper ends to each of said axle brackets and at their lower ends to said adjacent end of a corresponding walking beam and each arranged in a vertical plane extending lengthwise of the frame to permit lateral movement of said frame with reference to said walking beams.

11. A tandem axle suspension as set forth in claim 10 in which said planes of said tension leaf springs at one side of the vehicle toe in toward the front of the vehicle with reference to said planes of the tension leaf springs at the other side of the vehicle to render said tandem axles self-steering.

12. A tandem axle spring suspension adapted to be interposed between a vehicle frame and a pair of tandem axles journalled at the ends thereof, comprising a walking beam arranged at each side of said frame and extending lengthwise thereof, supporting bracket means arranged adjacent the center of each walking beam, bearing means connecting the central part of each walking beam to the corresponding bracket means to oscillate about a horizontal transverse axis, and at the least one tension leaf spring connected at its upper end to each end of each axle and at its lower end to the adjacent end of a corresponding walking beam and arranged in a vertical plane extending lengthwise of the frame to permit lateral movement of said frame with reference to said walking beams.

13. A tandem axle spring suspension adapted to be interposed between a vehicle frame and a pair of tandem axles each having wheels journalled at the ends thereof comprising a walking beam arranged at each side of said frame and extending lengthwise thereof, bearing means connecting the central part of each walking beam to the corresponding side of said frame to oscillate about a horizontal transverse axis, and tension leaf springs severally connected at their upper ends to the ends of said axles and at their lower ends to the ends of said walking beams, each end of said tension leaf springs comprising a center leaf arranged in a vertical plane extending lengthwise of the frame to permit lateral movement of said frame with reference to said walking beams, and side leaves in face contact with said center leaf and each side leaf having at its center a horizontal corrugation extending from one vertical edge to the other to permit said side leaves to shorten and lengthen vertically with reference to said center leaf.

14. A tandem axle suspension as set forth in claim 13 wherein a clip on each tension leaf spring is arranged to press said side leaves together into frictional contact with said center leaf above and below said corrugations.

15. A tandem axle spring suspension adapted to be interposed between a vehicle frame and a pair of tandem axles each having wheels journalled at the ends thereof, comprising a walking beam arranged at each side of said frame and extending lengthwise thereof, bearing means connecting the central part of each walking beam to the corresponding side of said frame to oscillate about a horizontal transverse axis, at least one tension leaf spring connected at its upper end to each end of each axle and arranged in a vertical plane extending lengthwise of the frame, and means connecting the lower end of each tension leaf spring to the adjacent end of a corresponding walking beam, comprising a holder having an enlarged base fitting upwardly against the underside of the walking beam, a pair of spaced upstanding walls fixed to said base and projecting through an opening upwardly into said walking beam, the corresponding tension leaf spring projecting downwardly through an opening in said walking beam above said spaced walls to a position between said spaced walls, and means securing said spaced walls to the lower end of said tension leaf spring.

16. A tandem axle spring suspension adapted to be interposed between a vehicle frame and a pair of tandem axles each having wheels journalled at the ends thereof, comprising a walking beam arranged at each side of said frame and extending lengthwise thereof, coaxial walking beam bearings supporting the frame on the centers of said walking beams, the members providing the bearing surfaces of each bearing having limited axial sliding movement relative to each other, means movably connecting each end of each walking beam to a corresponding axle end, and a radius rod pivotally connected at its outer end to an outer end of each walking beam and extending horizontally therefrom toward the center of the frame, and means pivotally connecting the inner end of each walking beam to the central part of said frame, whereby vertical movement of each walking beam end is translated into axial movement thereof along its bearing.

References Cited in the file of this patent

UNITED STATES PATENTS

| | | |
|---|---|---|
| 1,909,396 | Feigelson | May 16, 1933 |
| 2,017,001 | Hocking | Oct. 8, 1935 |
| 2,270,022 | Price | Jan. 13, 1942 |
| 2,456,719 | Martin | Dec. 21, 1948 |
| 2,493,004 | Mackie | Jan. 3, 1950 |
| 2,663,570 | Hickman | Dec. 22, 1953 |
| 2,689,136 | Hendrickson | Sept. 14, 1954 |
| 2,743,939 | Reid | May 1, 1956 |